INVENTOR
WILLIAM C. BROEKHUYSEN
ERNEST E. POHL
FRANK J. ROEHM
BY George S. Hastings
ATTORNEY Jan. 26, 1954 W. C. BROEKHUYSEN ET AL 2,667,020

REGISTRATION DEVICE

Filed Dec. 3, 1948

8 Sheets-Sheet 2

INVENTOR
WILLIAM C. BROEKHUYSEN
ERNEST E. POHL
FRANK J. ROEHM
BY George S. Hastings
ATTORNEY INVENTOR
WILLIAM C. BROEKHUYSEN
ERNEST E. POHL
FRANK J. ROEHM
BY George S. Hastings
ATTORNEY INVENTOR
WILLIAM C. BROEKHUYSEN
ERNEST E. POHL
FRANK J. ROEHM
BY George S. Hastings
ATTORNEY Jan. 26, 1954 W. C. BROEKHUYSEN ET AL 2,667,020

REGISTRATION DEVICE

Filed Dec. 3, 1948

8 Sheets-Sheet 5

INVENTOR
WILLIAM C. BROEKHUYSEN
ERNEST E. POHL
FRANK J. ROEHM

BY George S. Hastings

ATTORNEY

INVENTOR
WILLIAM C. BROEKHUYSEN
ERNEST E. POHL
FRANK J. ROEHM
BY George S. Hastings
ATTORNEY INVENTOR
WILLIAM C. BROEKHUYSEN
ERNEST E. POHL
FRANK J. ROEHM
BY George S. Hastings
ATTORNEY

REGISTRATION DEVICE

Filed Dec. 3, 1948

INVENTOR
WILLIAM C. BROEKHUYSEN
ERNEST E. POHL
FRANK J. ROEHM
BY George E. Hastings
ATTORNEY Patented Jan. 26, 1954

2,667,020

UNITED STATES PATENT OFFICE 2,667,020

REGISTRATION DEVICE

William C. Broekhuysen, Garden City, and Ernest E. Pohl, Elmhurst, N. Y., and Frank J. Roehm, Newark, N. J., assignors to American Machine & Foundry Company, a corporation of New Jersey Application December 3, 1948, Serial No. 63,342

32 Claims. (Cl. 53—13)

Figure 1:
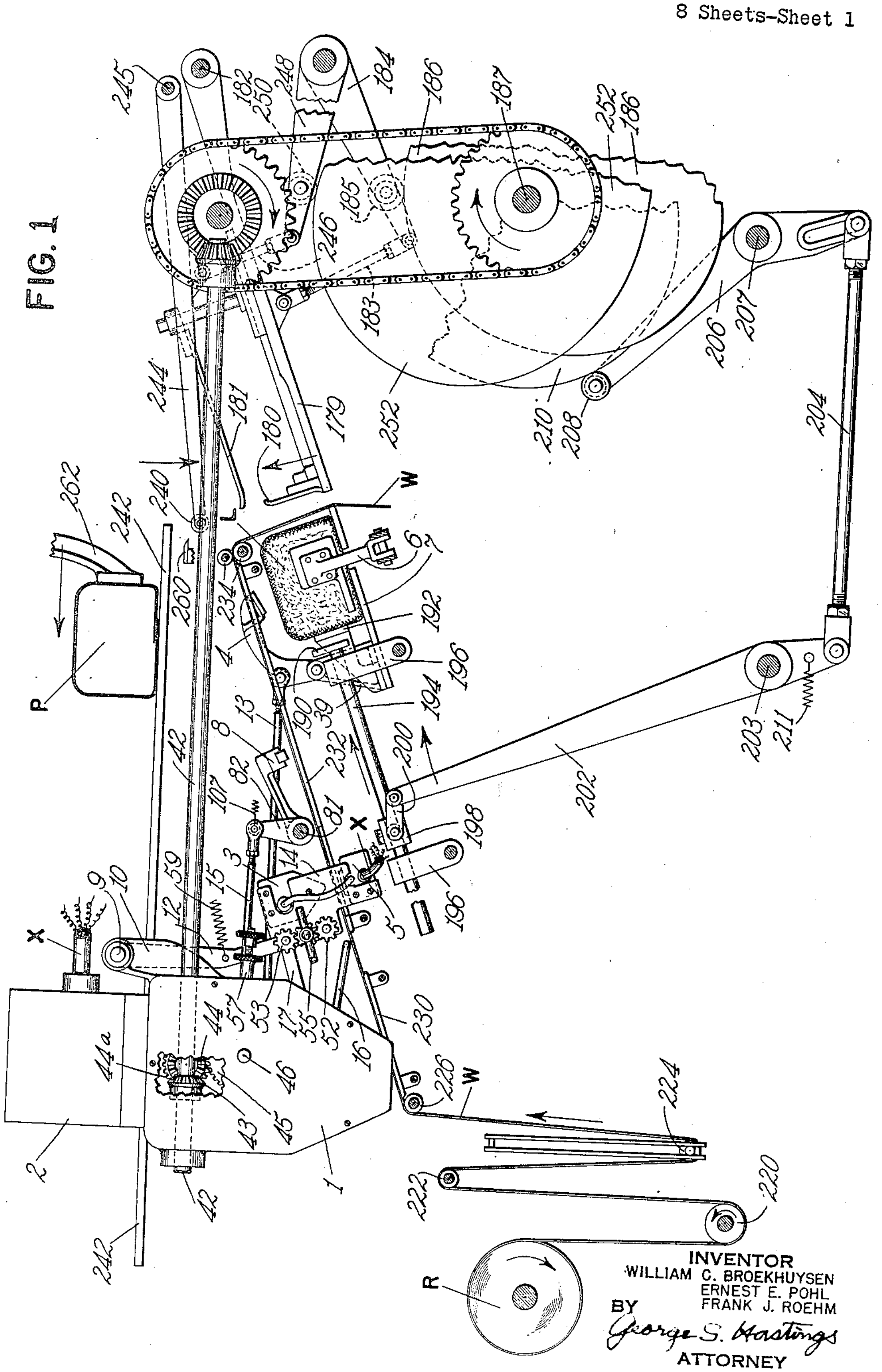

This invention relates to wrapping machines, more particularly to improvements in web registering devices for maintaining printed panels or other printed matter on a web of wrapping material in a predetermined position relative to one of the faces of the article to be wrapped.

In a prior web registering device used on a machine for wrapping articles of varying girth, such as loaves of bread, the leading end of a continuous web of wrapping material is fed forwardly during the enfoldment of the article by an amount greater than required to enfold an article of predetermined girth. The leading end of said web is then retracted relative to the next article to be enfolded therein after severance of the portion of the web enfolding the preceding article, until the printed panel or other printed matter was located in a predetermined position with respect to the next article to be wrapped. For this purpose the web of wrapping material was provided with a series of indicia spaced at equal intervals along the length of said web to stop the retraction thereof when one of the indicia reached a predetermined position intercepting the light beam of a photoelectric scanner controlling the mechanism for retracting the web, and thereby regulate the extent of retraction of the web. For any reason such as slippage of the web of wrapping material, too small a loaf to be wrapped, too little stroke of the lap-roller of the wrapping machine, the presence of a splice in the web of wrapping material, the installation of a new roll of wrapping material, etc., the indicia occasionally failed to pass the scanner during the enfoldment of the loaf in the leading end of the web of wrapping material. Then the web would be retracted a maximum amount and stopped in a position wherein the light beam of the scanner is not intercepted by an indicia. Therefore, the web would be retracted by a maximum amount in the succeeding cycles of operation irrespective of variations in the height of the articles to be wrapped until an indicia intercepted the light beam of the scanner. Therefore open bottom seams on the wrapped loaves resulted and rewrapping of many loaves was required.

One of the main objects of this invention is to overcome this cause of rewraps.

A further object of this invention is to discontinue the retraction of the web of wrapping material relative to the loaf or other article to be wrapped, if the indicia is not advanced past the scanner during the enfoldment of the preceding loaf in the leading end of the web of wrapping material.

Still another object of this invention is to provide a novel continuous strip or web of wrapping material which will cause operation of the retractor with a very short stroke in the event the web of wrapping material is not in the proper position to be registered relative to the loaf to be wrapped after the enfoldment of the preceding loaf in the leading end of the web of wrapping material. For this purpose the web of wrapping material may be provided with a printed lattice pattern, or multiple registration spots, whereby the loaves will be wrapped in more than the normal length of wrapping material to avoid insufficient overlap of the wrapper edges, until the web is again in the proper position. Therefore a number of loaves will be wrapped without registration before the printed label or other printed matter is again centered on the top or other face of the loaf.

A still further object of this invention is to control the position of the leading end of the web of wrapping material in accordance with variations in the height of the loaf or other article to be wrapped. Thus the printed label or design will be more exactly centered on the top or other face of the article to be wrapped than was possible heretofore.

In this connection a further object of the invention is to move the scanner about a fixed pivot point in such a relation to the web and at sufficient distance from the pivot point that the scanner is substantially perpendicular to the web for all positions within the range of compensation required. The exact registration or stopping point of the scanner for each loaf may be controlled in accordance with variations in the height of the loaf to assure the desired location of the printed label or pattern on the package.

Another object of the invention is to interrupt the retraction of the web of wrapping material when no article is delivered into position to be wrapped. Preferably the height and/or the absence of the article to be wrapped is determined at a station preceding the delivery station at which an article is delivered to the wrapping mechanism of the machine. Thus more time is available for this operation and it may be performed on a stationary article without curtailing the time available for the other operations.

Still another object of the invention is to assure uninterrupted register operation, regardless of excessive variations in girth or height of the load. This object may be obtained by a suitable electrical sequence control system and a standard register amplifier and scanner operating on the trailing edge of the indicia or printed marks on the web of wrapping material. Thus the photocell will respond to a change from dark to light when the register mark is dark on the light background of web. This electrical sequence control and trailing edge operation collectively provides automatic "pull in" of the web of wrapping material into registered position regardless of the position of the register mark in relation to the scanner. The uninterrupted register operation, regardless of excessive variations in girth or height of the loaf, may be accomplished with either single spot indicia or multiple spots (sometimes called "ladder patterns") or register marks printed on the web of wrapping material. The latter method permits a definite simplification electrically and mechanically of the web registering mechanism, yet it provides all the functions of the single spot register scheme.

With these and other objects not specifically mentioned in view the invention consists in certain features which will be hereinafter described and claimed in the appended claims.

Figure 2:
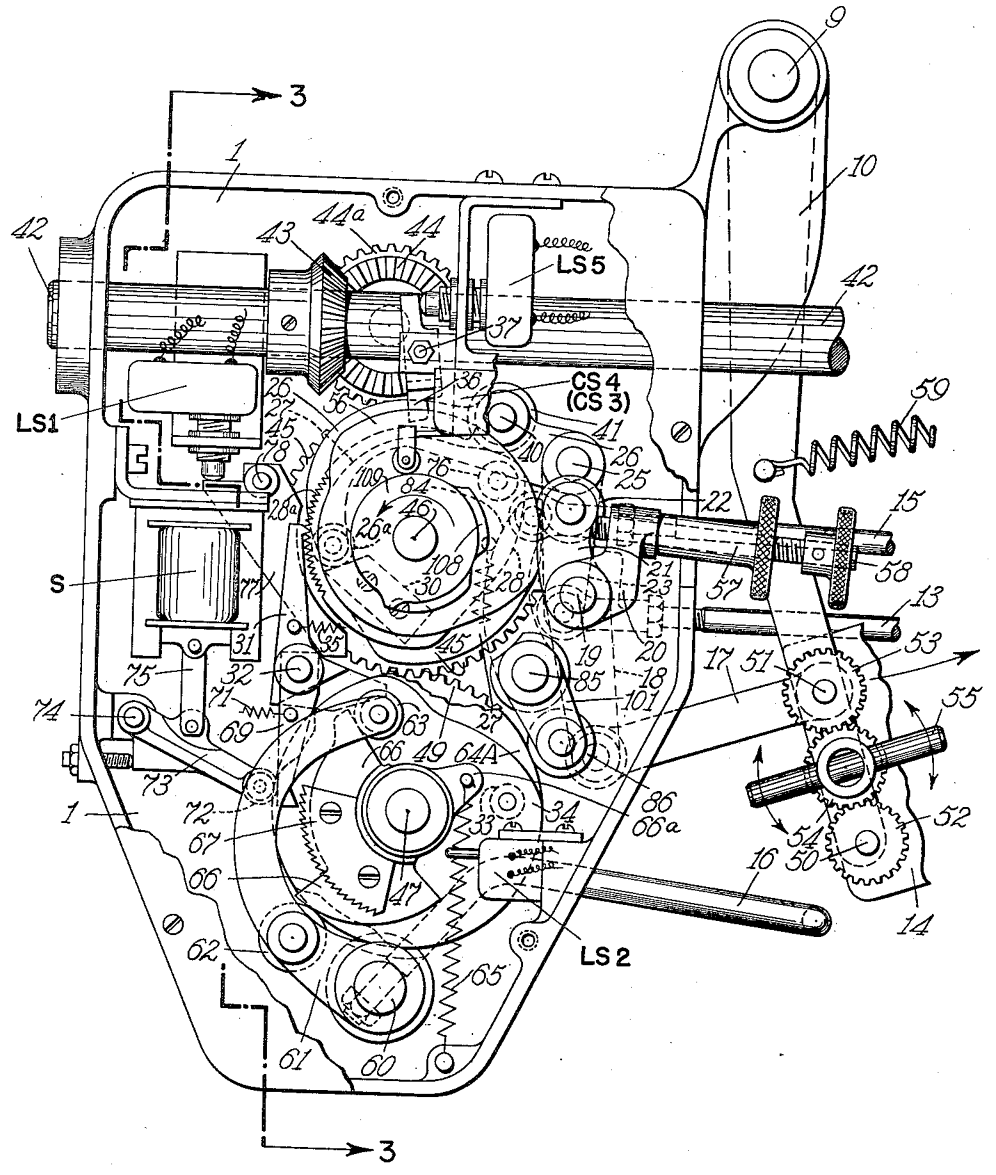
Figure 3:
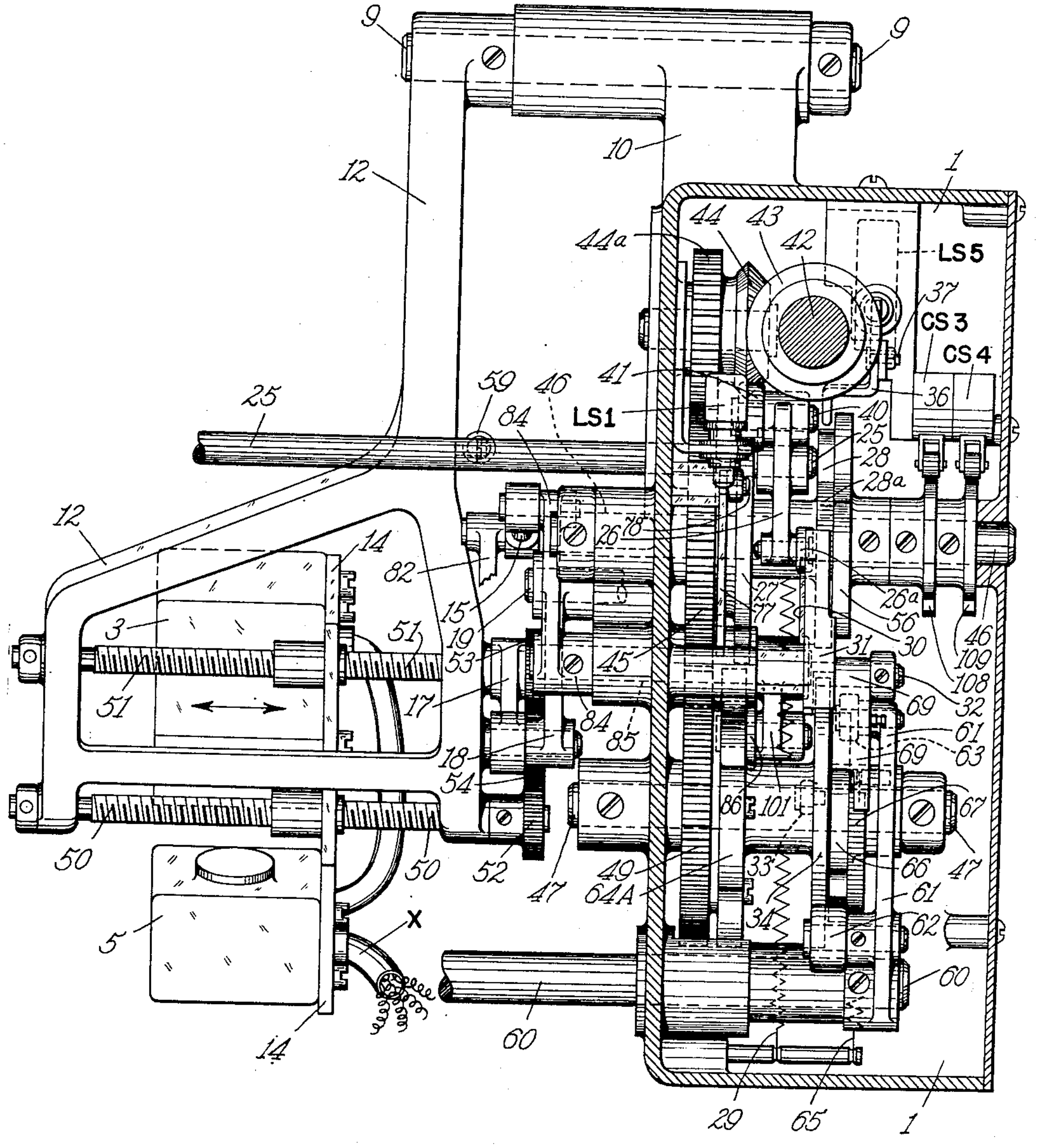
Figure 4:
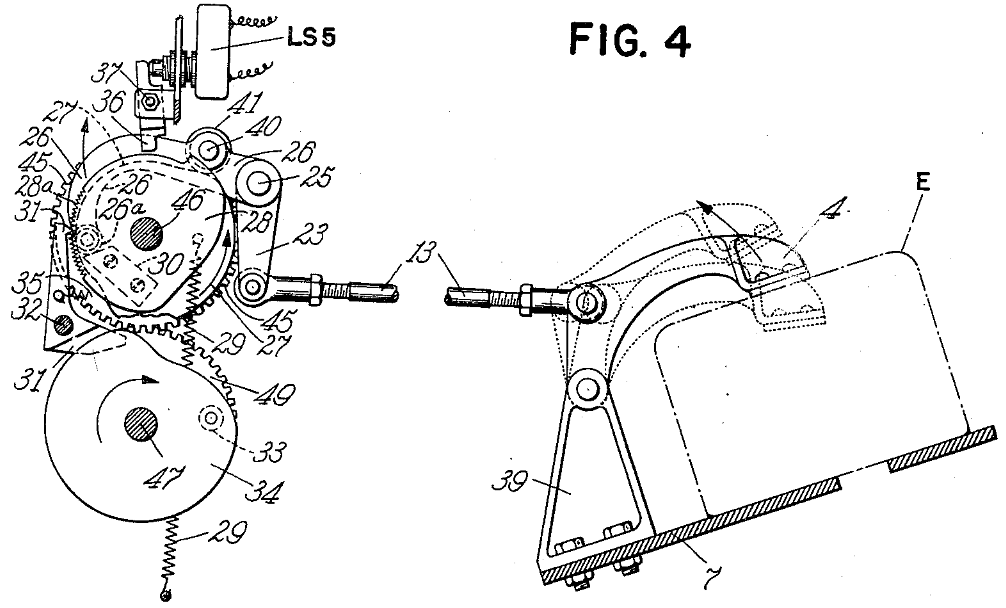
Figure 5:
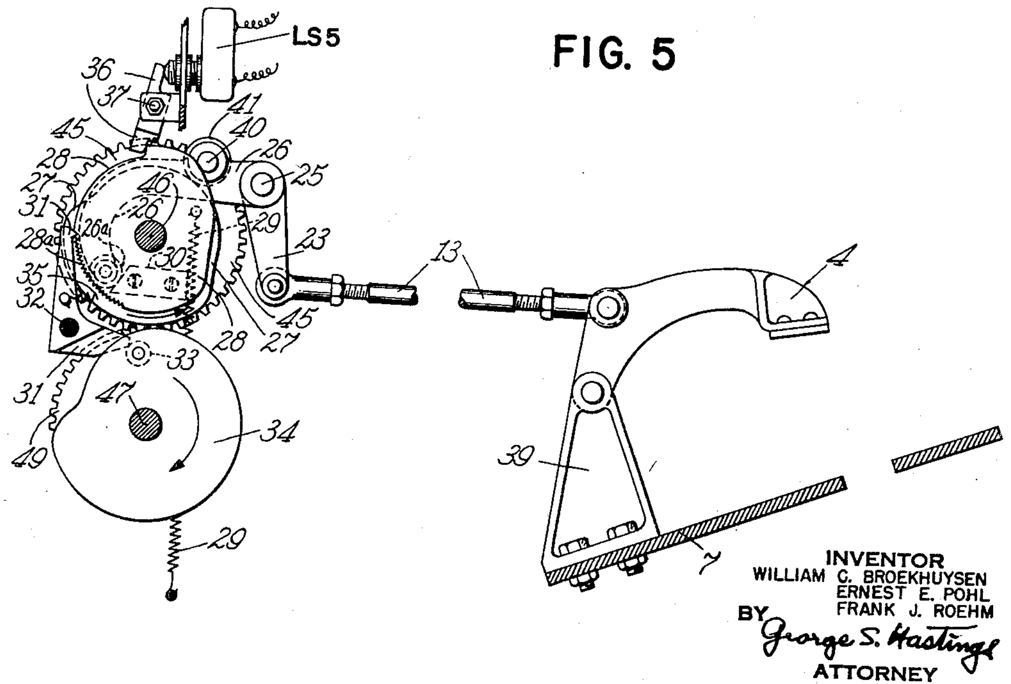
Figures 6, 7, 8, 9:
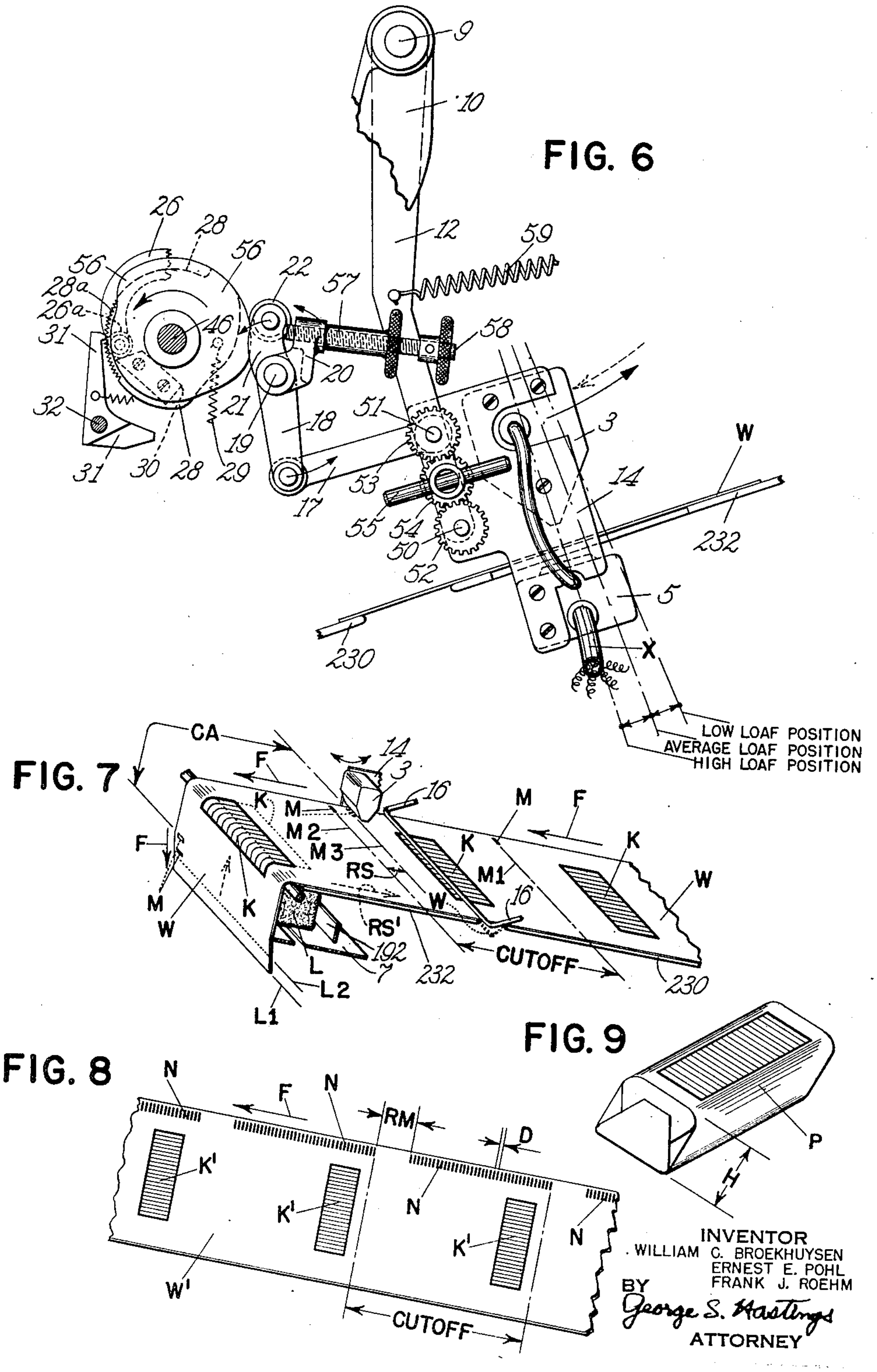
Figure 10:
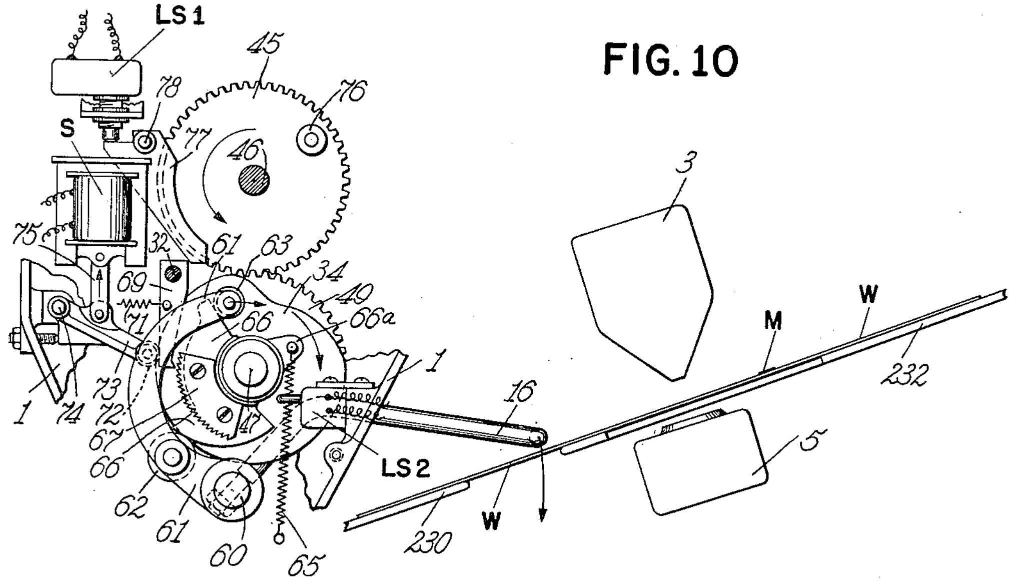
Figure 11:
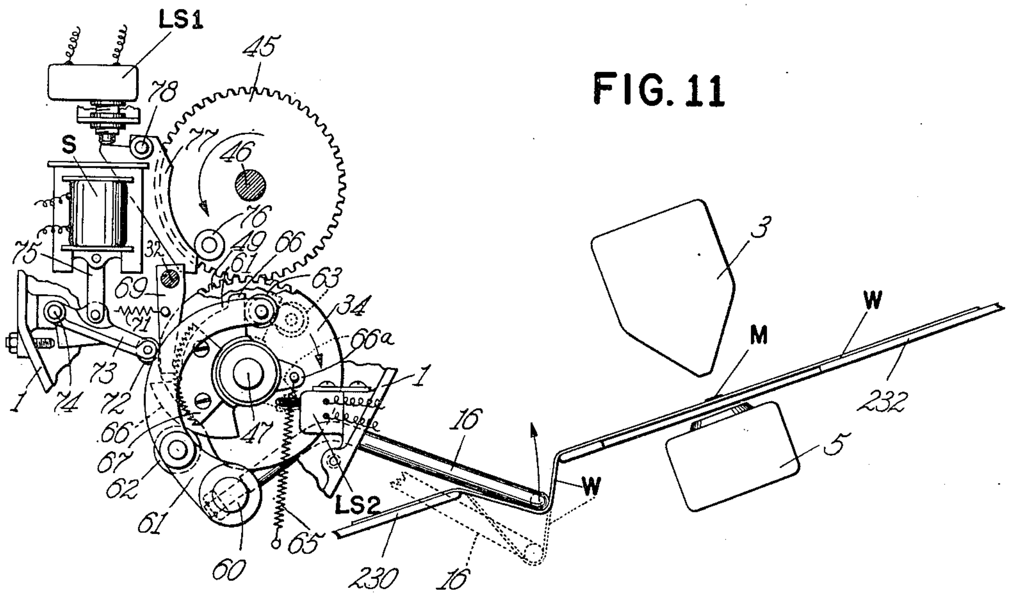
Figures 12, 13, 14:
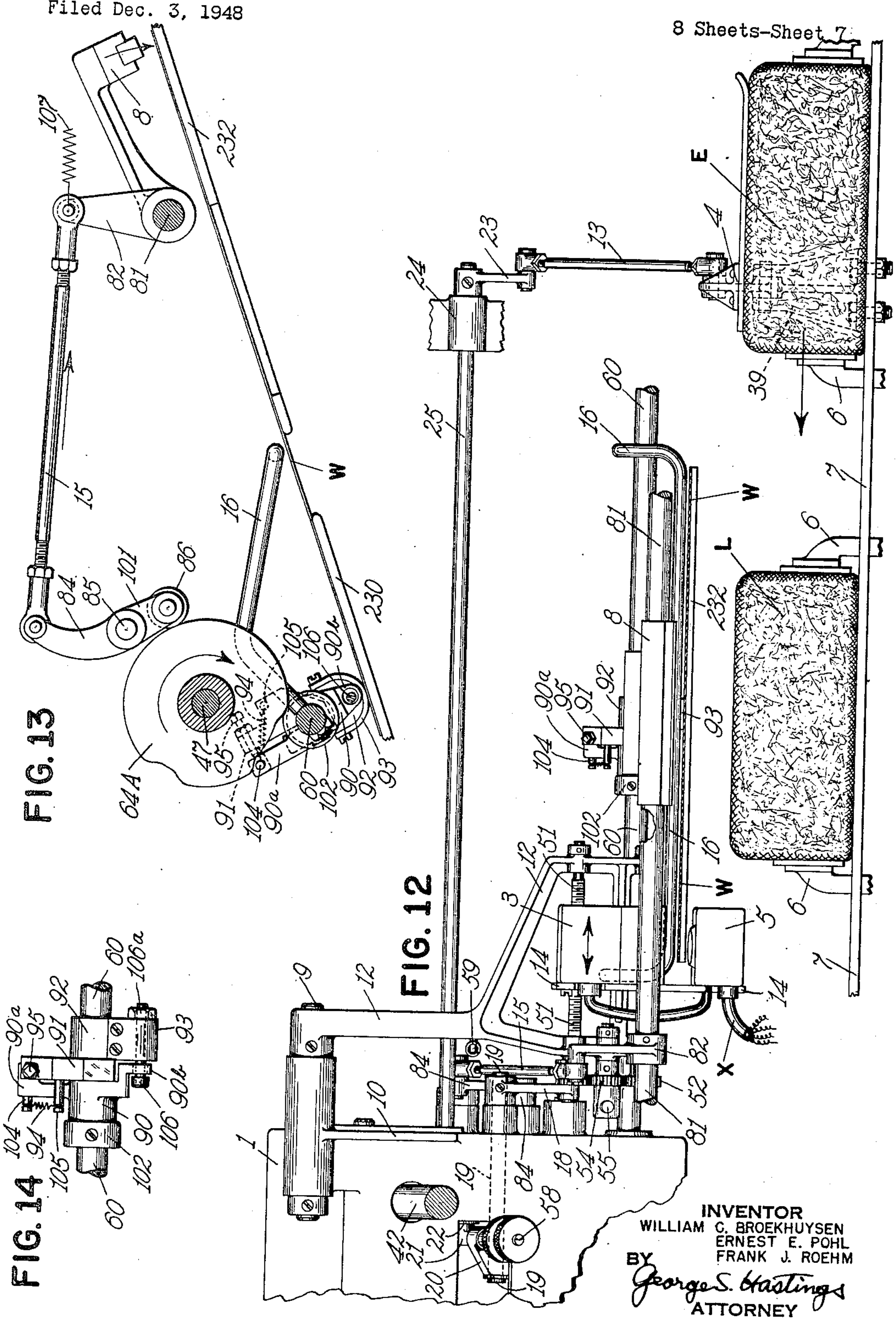
Figure 15:
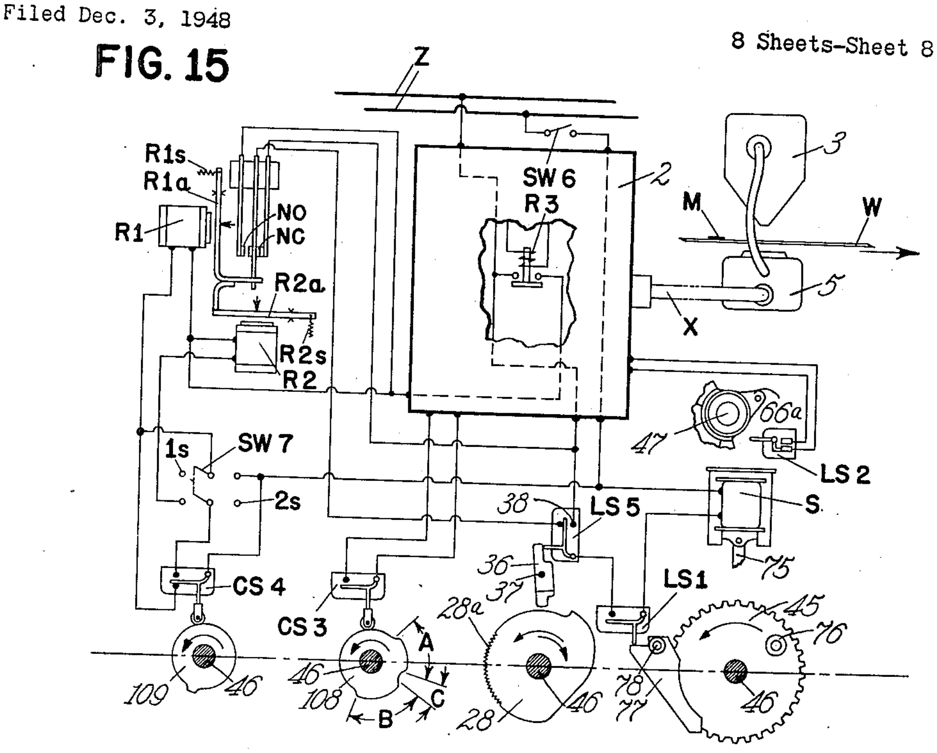
Figure 16:
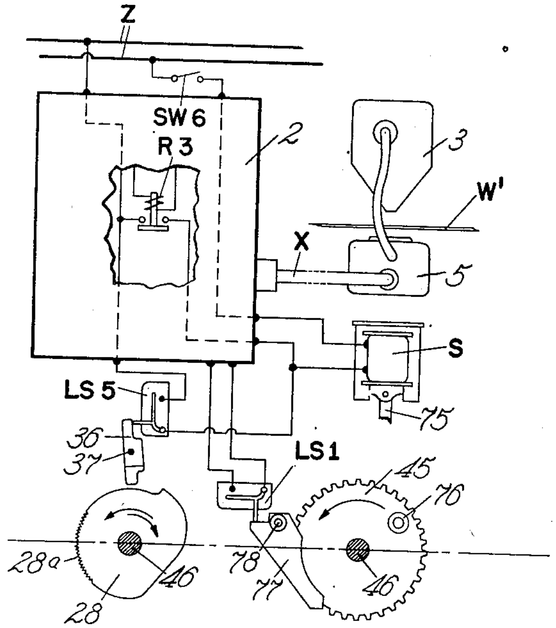

In the accompanying drawings which form a part of this specification:

Fig. 1 is a schematic side elevation of a wrapping machine equipped with a web registration device embodying my invention, Fig. 2 is a side elevation on an enlarged scale of the registration control mechanism, Fig. 3 is a sectional end elevation on the same enlarged scale of the registration control mechanism, taken on line 3—3 of Fig. 2, Figs. 4 and 5 are detail side elevations illustrating the construction and operation of the feeler mechanism, Fig. 6 is a detail side elevation of the photoelectric scanner mechanism, Fig. 7 is an isometric diagrammatic view illustrating a web of wrapping material with single spot registration marks or indicia, Fig. 8 is a plan view of a web of wrapping material bearing multiple spot registration marks or indicia, Fig. 9 is an isometric view of a wrapped loaf with the printed panel of its wrapper in the required location on the top of the loaf, Figs. 10 and 11 are detail side elevations illustrating the construction and operation of the web retractor, Fig. 12 is a detail end elevation illustrating the various web control mechanisms in their respective locations in the wrapping machine, Fig. 13 is a detail side elevation showing the web clamping mechanisms in conjunction with the web retractor, Fig. 14 is a detail front elevation of the rear web clamp, Fig. 15 is a diagram of an electrical control mechanism suitable for registering single spot webs, and Fig. 16 is a diagram of a modified form electrical control mechanism suitable for the registration of multiple spot webs.

In the operation of the wrapping machine upon which our novel web registering mechanism is installed an infeed conveyor 6 of conventional construction (Fig. 1) advances the loaf L, or other article to be wrapped, along an inclined infeed runway 7 to a predetermined station opposite a lifter table 179. Conveyor 6 consists of opposed pairs of flights, which project through a longitudinal slot in runway 7 and between which the loaves L are inserted, the flights being supported on an endless conveyor chain intermittently driven in a well known manner wherefore further description thereof is deemed unnecessary. The lifter table 179 may have a construction similar to that described in the Jensen Patent 2,385,706 and be provided with a back tension plate 180 and a top tension plate 181 supported thereon in the manner described in said patent. Table 179 is pivotally mounted on a shaft 182 suitably supported in the side frames (not shown) of the machine. An adjustable connecting rod 183 connects the lifter table to a cam lever 184 carrying a cam roller 185 engaging a cam 186 mounted on a cam shaft 187 supported in the side frames (not shown) of the machine and suitably driven from a source of power (not shown) whereby an intermittent oscillating motion is applied to the lifter table in timed relation to the other parts of the machine. The lifter table 179 normally occupies a position aligned with the runway 7 to permit the loaf L, or other article to be wrapped, to be delivered thereto by the pusher plate 190. The plate 190 is aligned with a cutout portion of a guide plate 192 extending along one side of the runway 7 whereby pusher plate 190 may pass through said cutout portion of guide plate 192 to engage loaf L and deliver it to the lifter table. The pusher plate 190 is actuated by a rod 194 slidably supported in brackets 196. A crosshead 198 secured on rod 194 is connected by a link 200 to a lever 202 which is fulcrumed on a shaft 203 supported in the side frames and operated through a connecting rod 204 from a cam lever 206 fulcrumed on a shaft 207 supported in the side frames. A cam roller 208 on lever 206 is maintained against a cam 210 on cam shaft 187 by a tension spring 211 connected to lever 202 and anchored on one of the side frames whereby the pusher plate 190 will be operated to deliver loaf L to the lifter table 179. Since the construction of the mechanism for operating the lifter table 179 and pusher plate 190 is similar to that shown in the copending application of T. Jensen, Ser. No. 758,417, filed July 1, 1947, further description thereof is deemed unnecessary.

The web of wrapping material W is supplied to the machine from a roll R and passes under a continuously rotating feed roller 220, over a guide roller 222 and under a floating roller 224 to another guide roller 226. Further description of these rollers is deemed unnecessary since their construction and operation is fully described in the Gwinn Patent 1,626,409. The web W then passes along the top of the spaced plates 230 and 232 and extends through a pair of guide rollers 234 so that its leading end hangs freely in front of the loaf L and between the runway 7 and the lifter table 179. Thus the loaf L will be partially enfolded in the leading end of web W when it is delivered to the lifter table 179 by pusher plate 190. Further enfoldment of loaf L in the web W will be accomplished by the lap roller 240 which is operated to draw the web W down over the rear face of the loaf L after the latter has been delivered to the lifter table 179 while the table ascends to a horizontal position aligned with the delivery table 242. The lap roller 240 is supported in the ends of arms 244 attached to a shaft 245 supported in the side frames (not shown) of the machine. One of the arms 244 is connected by a connecting rod 246 to a cam lever 248 carrying a cam roller 250 engaging a cam 252 mounted on a cam shaft 187. The lap roller 240 is thus operated to move downward to a position (not shown) whereby the length of wrapping material drawn from roll R and over the plates 230 and 232 is greater than the distance between the indicia or printed marks M which are spaced at equal intervals along one edge of web W. The web W is then severed by a knife 260 of conventional construction operated by mechanism such as shown in Jensen Patent 2,385,706 while the web W is pinched against the edge of the lifter table by suitable mechanism such as shown in said Patent 2,385,706. A set of flights or fingers 262 on conveyor chains (not shown) of conventional construction then push the wrapped loaf in the direction of the arrow from the lifter table on to the delivery table whereby the outer longitudinal edge of the wrapper provided by severance of web W is lapped upon the other longitudinal edge thereof. Thus the wrapper is folded about the girth of loaf L, and the ends of the wrapper are folded inwardly over the ends of the loaf by folders (not shown) while the wrapped loaf is advanced by fingers 262.

Since the distance between successive indicia or printed marks M on the web W equals the length of wrapping material required to properly enfold a loaf, or other article to be wrapped, having a predetermined girth, the over-feeding of the web W by the lap roller 240 requires that the web W be retracted to locate the leading printed panel or other printed pattern K thereon in a predetermined position relative to the next article to be wrapped, this position of the printed panel being determined by the variations in the height of said article as will be hereinafter described.

The embodiment of the web registering mechanism illustrated in Figs. 1–15 inclusive consists of a housing 1 wherein is enclosed the operating mechanism hereinafter described, for the web retractor; the amplifier 2 which forms a part of the electrical control for said operating mechanism; the light source 3 from which a beam of light is projected upon the web of wrapping material; a photo-electric cell 5, the light source 3 and photo-electric cell 5 constituting a scanner forming a part of the electrical control; the feeler 4 for measuring the height of the loaf, or other article to be wrapped, which forms a part of the operating mechanism for the web retractor; and the web retractor 16.

The scanner may consist of a light source 3 of any suitable construction arranged above the web of wrapping material W and a photo-electric cell 5 of any suitable construction arranged below the web W. In a lug 10 formed on housing 1 is pivotally mounted a shaft 9 to which is secured an arm 12 supporting a plate 14 to which the light source 3 and photo-electric cell 5 are attached (Fig. 6). The plate 14 is threaded on two threaded shafts 50 and 51 supported by arm 12 (Figs. 3 and 12). Thus the scanner is supported for pivotal movement about shaft 9. Shafts 50 and 51 carry gears 52 and 53 meshing with an intermediate gear 54 which may be operated manually by a handle 55 attached thereto to move the scanner toward or away from the center line of the web W. This adjustment is made to suit the position of the indicia on varying widths of web W required for wrapping various lengths of the loaf L, or other article to be wrapped. Oscillatory motion is imparted to the arm 12 through a link 17 which is pivotally connected at one end to the shaft 51 supported in plate 14 and pivotally connected at its other end to an arm 18 which is secured to a shaft 19 supported in one side wall of the housing 1. Arm 20, which is also secured to shaft 19, carries a threaded locking sleeve 57 which projects through a slot provided in housing. An adjustable screw 58 is threaded into sleeve 57 and engages a cam lever 21 loosely mounted on shaft 19. A cam roller 22 on cam lever 21 is maintained in engagement with a scanner cam 56 by a tension spring 59 (Fig. 6) connected to arm 12 and anchored on one of the side frames (not shown) to impart oscillating motion to the scanner about shaft 9. The center of this oscillating motion can be shifted back or forward in the line of travel of the web W by turning adjustment screw 58 in or out in the sleeve 57 as required. This adjustment permits shifting of the location of the printed panels or other equally spaced printed matter on the web W in relation to the top of the loaf, or other article to be wrapped, without regard to the height thereof to compensate for slippage of the web, different speeds of operation, etc.

The oscillating motion imparted to the scanner through cam 56 would follow the peripheral contour of this cam except for the fact that cam roller 22 is wide enough to extend across both the cam 56 and the rack cam 28, which in a manner will be hereinafter described, assumes a position determined by the height of the article to be wrapped.

*Height compensation*

With reference to Figs. 4, 5 and 12, the gauging of the loaf, or other article to be wrapped, to compensate for variations in the height thereof, will now be described. On a shaft 42 (Figs. 1 and 2) which is supported in the front and rear walls of housing 1, is secured a bevel gear 43 driving a bevel gear 44 supported in one side wall of housing 1. A spur gear 44*a* formed on gear 44 drives a gear 45 secured on shaft 46 in a predetermined timed relationship to the machine, so that for each loaf wrapped shaft 46 makes one complete revolution. In other words, if 43 loaves per minute is the wrapping speed, then shaft 46 turns at 43 R. P. M., and also turns the cam 27, which is secured thereon, at the same speed. The weight of the feeler 4, which is pivoted on a bracket 39 secured to platform 7 and connected through an adjustable connecting rod 13 to a lever 23 secured on a shaft 25 whereon is also secured a cam lever 26 provided with a stud 40 supporting cam follower 41, keeps the cam follower 41 against cam 27. This imparts intermittent up and down motion to the feeler 4. By adjustment of the connecting rod 13 the range of movement of the feeler, as illustrated in dotted lines in Figure 4, can be shifted as required for the average height of the loaf to be wrapped. The range of the feeler may be such that it will function for loaves that vary above and below the average height by approximately one half inch. Furthermore, the motion of the feeler is in such timed relation to the infeed conveyor (Fig. 12) that while a loaf E is being advanced in the direction shown by arrow (Fig. 12) the feeler is raised out of contact with the loaf and is moved down into contact with the loaf to gauge its height when the infeed conveyor is stationary. The position the feeler assumes due to the height of the loaf being gauged, locates the rack cam 28 through the engagement of a roller 26*a* on the outer end of an extension on cam lever 26 with a stop 30 attached to one face of the rack cam 28 which is normally held stationary by a lock pawl 31 mounted on stub shaft 32 and engaging rack teeth 28a on the periphery of cam 28. Cam 28 is loosely mounted on shaft 46 and stop 30 yieldingly held against the roller 26a by the action of a tension spring 29 secured to cam 28 and anchored on a post 29a secured in one of the side walls of housing 1, whenever the roller 33 fixed to the back of the cam 34 disengages the pawl 31 from rack teeth 28a. Cam 34 is mounted on a shaft 47 which carries a gear 49 driven from gear 45 in a predetermined timed relationship such that the lock pawl 31 is disengaged from the teeth 28a of rack cam 28 during the period the feeler 4 is gauging the loaf, and just before the feeler moves up from the loaf, by the engagement of the roller 33 on cam 34 with the pawl 31. A tension spring 35 connected at one end to pawl 31 and suitably anchored at its other end then re-engages the pawl 31 with the rack teeth 28a of cam 28, thereby locking it in a position determined by the loaf height and holding it in this position until the loaf moves from the gauging position to the station from which the loaf is delivered to the lifter table. The position of this cam 28 then determines the position that the scanner will assume when it is displaced along the length of web W, because the engagement of cam roller 22 with the periphery of cam 28 will determine the extent of displacement of the scanner. Referring to Fig. 6 it will be seen that the shape of the periphery of cam 56 is such that when it revolves in the direction indicated by the arrow the cam roller 22 will be lifted off the periphery of cam 28 and the scanner will be displaced a predetermined maximum extent to the left as viewed in Fig. 6. The cam roller 22 will then ride off the cam 56, and engage the periphery of cam 28, whereby the scanner will be swung back to the right to a position determined by the setting of cam 28 in accordance with the height of the loaf gauged by feeler 4.

It will be understood that the feeler engages the loaf E immediately adjoining the loaf L which is delivered to the lifter table (Fig. 12) whereby the web W will be retracted into the proper position to be folded about loaf E, following the severance of the portion thereof folded about loaf L. If the feeler engages a loaf having an average height the cam 28 will be set and the scanner will be stopped in the position illustrated in Fig. 6 wherein the center line through the scanner and the pivot on shaft 9 is indicated by the legend "Average Loaf Position." If the cam 28 is set in the position illustrated in Fig. 5, by a loaf whose height is lower than the average height the scanner will be stopped in a position wherein the center line through the scanner and the pivot on shaft 9 occupies the position indicated by the legend "Low Loaf Position" in Fig. 6. Should the feeler engage a loaf whose height is higher than average, the cam 28 will be set and the scanner will be stopped in a position wherein the center line through the scanner and the pivot on shaft 9 will occupy the position indicated by the legend "High Loaf Position." It may be noted that the linkage for displacing the scanner is so proportioned that the position of the latter will be varied in a 1:1 ratio to variations in the height of the article to be wrapped wherefore the leading indicia on the web W will be stopped during retraction thereof in a predetermined position which will center the leading printed label or pattern K with respect to the top face of the article which is to be wrapped in the leading end of web W.

This then restricts the amount of movement of the scanner in the direction of the length of web W depending on the loaf height. This will vary, of course, with the height of each loaf. This motion is in such timed relation to the wrapping operation that when retraction of the web W by the retractor 16 occurs, as will be hereinafter described, the scanner is in a stationary position determined by the height of the article to be wrapped.

Referring to Figs. 2, 3 and 13 it will be observed that the mechanism for operating the retractor 16 includes the gear 49 which is fastened on shaft 47 and driven from the gear 45, gears 45 and 49 having a 1:1 ratio whereby the shaft 47 will be turned one revolution in each cycle of the machine. The retractor 16, which may be of any suitable shape such as U-shaped bar shown in the drawings, has its ends secured in a stub shaft 60 rotatably mounted in the front side wall of housing 1. A cam lever 61 fulcrumed on shaft 60 carries cam followers 62 and 63. The cam follower 62, which normally engages the periphery of a cam 34 secured on shaft 47, also extends across the periphery of a cam segment 66 loosely mounted on shaft 47. A tension spring 65 connected to cam segment 66 and anchored on housing 1 turns cam segment 66 into position to engage cam follower 63 and thereby maintain cam follower 62 against the periphery of cam 34. Therefore, a maximum displacement or full stroke of the retractor will be produced in each revolution of shaft 47 unless a ratchet 67 fastened on segment 66 is engaged by pawl 69. In that event the stroke of the retractor will be determined by which point of the ratchet 67 is engaged by the pawl 69.

Pawl 69 is pivoted on shaft 32 and is normally maintained out of engagement with ratchet 67 by a tension spring 71. A roller 72, which is mounted on a lever 73 fulcrumed on a pin 74 set in housing 1 and connected by link 75 to the core or plunger of a solenoid S, will displace the pawl 69 into engagement with ratchet 67 when solenoid S is energized in a manner which will be hereinafter described.

Referring to Figs. 4, 5 and 12 it will be observed that if there is no loaf in position under the feeler 4 during a skip in a single cycle of operation of the machine, or in a succession of skips in successive cycles, provision is made to prevent the retractor 16 from operating to retract the web W. This should be done, because the photoelectric cell 5 operates only on a change in light. Hence, there would be nothing to prevent full retraction of the web W following a single skip or a succession of skips.

Fig. 5 illustrates the position the feeler 4 assumes with no loaf in the infeed conveyor 6 directly underneath it. This is the lowest point it can reach which is well below the height of the smallest loaf. This also corresponds to the lowermost position to which cam 27 can be turned by spring 29. It can be seen when Fig. 5 is compared to Fig. 4 that the low point of the feeler, through the action described previously, causes cam lever 26 to permit rack cam 28 to turn a maximum amount when lock pawl 31 is disengaged from it. This action produces engagement of the high point of rack cam 28 with a lever 36 which pivots about pin 37 as a fulcrum and thereby closes a limit switch number L. S. 5. This then locks out the retractor and prevents it from retracting the web W by action of a control circuit to be described later.

Normally the retractor 16 pulls the web W back from the overfed position produced by the lap roller 240, so that the advertising or label frames K will be located in the desired location and wrapping of the article therein will be accomplished in the manner described above. The stop position of the retractor 16 will vary with each loaf between the top position thereof shown in Fig 10 and the extreme bottom position thereof shown dotted in dotted lines in Fig. 11. The dotted position of the retractor 16 (Fig. 11) corresponds to the maximum retraction obtainable of about 2¾" to 3". It may be noted that the retractor protrudes from a slot in housing 1 and engages the portion of web W intermediate the tables 230 and 232.

There will be a full stroke of retractor 16 in each revolution of cam 64 unless the ratchet 67, which is fixed to cam segment 66, is engaged by a pawl 69 pivoted upon a stud 70 secured in housing 1. It will be seen that when pawl 69 engages rack 67 at any point the motion of retractor 16 is stopped. Stopping of cam segment 66 prevents cam roller 62 and lever 61 from following the contour of the periphery of cam 64 and thus the stroke of retractor 16 is regulated.

The limit switch L. S. 1 (Figs. 2, 10 and 11) which may be of any suitable construction and arranged within housing 1, is closed upon engagement of a roller 76 on gear 45 with an arm 77 pivoted on a stud 78, thereby swinging arm 77 upwardly to close limit switch L. S. 1. A limit switch L. S. 2 is also arranged within housing 1 to be engaged by a lug 66a on cam segment 66 for a purpose which will be hereinafter described. Cam switches C. S. 3 and C. S. 4 (Fig. 3) are also arranged within housing 1 to be closed by cams 108 and 109 secured on shaft 46. A complete description of the control circuit connected to the solenoid S, cam switches C. S. 3 and C. S. 4 and limit switches L. S. 1, L. S. 2 and L. S. 5 will be made hereinafter.

The construction and operation of the paper clamps will now be described. The rear paper clamp (Figs. 13 and 14) has the function of preventing the web W from slipping back during skips (absence of a loaf under feeler 4) in the infeed conveyor, and also to prevent the web W from being pulled off the roll R when the retractor is depressed. The rear paper clamp includes a hub 90 loosely mounted on shaft 60 and having an upwardly projecting extension 90a and a downwardly extending projection 90b. Arm 91 is fixed to retractor shaft 60 and rotates therewith. Eccentric cam piece 92 is pivoted freely on shaft 60 and has an extension which is covered with a leather piece 93 which comes in contact with the web W, and in the position shown in Fig. 13 prevents the web W from slipping down the support plates 230 and 232 (from right to left). On the extension 90a of hub 90 is provided a spring post 104 which is connected by a tension spring 94 to a spring post 105 on the arm 91 (Fig. 14). The other extension 90b of hub 90 has an opening through which projects a bolt 106 passing through member 92 and retained therein by a nut 106a.

Thus, when the retractor descends, tension is imposed on spring 94 to cause the hub 90 to turn cam piece 92 and thus preventing the web W from being pulled forward from the roll R when retraction occurs.

The action of the main paper clamp 8 (Figs. 1 and 13) is to clamp the web W during the severance thereof and at the end of the retractor stroke when the two dips in the main paper clamp cam 64a engage the cam roller 86 on cam lever 101. The cam 64a is secured on shaft 47, and cam lever 101 is secured on a stub shaft 85 mounted in housing 1 The clamp 8 is secured on a shaft 81 carrying an arm 82 connected by a connecting rod 15 to an arm 84 secured on shaft 85, and clamp 8 is thereby operated by the cam lever 101 in the required timed relationship.

*Single spot register paper or web*

A continuous web of wrapping material W having single printed marks or indicia M spaced at the required intervals along the length thereof with its leading end draped in front of the loaf L, or other article to be wrapped, is illustrated in Fig. 7. The electrical register control associated therewith, including the scanner comprising the light source 3 and photo-cell 5, amplifier 2, solenoid S, interlocking relays R1 and R2, cam switches C. S. 4 and C. S. 3, and limit switches L. S. 1, L. S. 2 and L. S. 5 are shown in the wiring diagram (Fig. 15)

Fig. 7 also illustrates the arrangement on web W of the printed labels or patterns represented by the cross-sectioned rectangles K in order to bring the same on the top of each loaf and centered thereon regardless of variations in the height of each article and thereby provide a properly wrapped article P illustrated in Fig. 9.

The distance between two adjoining printed marks or indicia M which is represented by the dimension line "Cutoff" in Fig. 7, corresponds to the length of wrapping material required to enfold the girth of an average loaf or other article to be wrapped. Once the cutoff is determined for a series of loaves, or other articles of varying girth which are to be wrapped, then this constant average girth will be used for any number of loaves wrapped.

*Normal operation*

The loaf L is pushed into the leading end of the web W and onto the lifter table 179 (Fig. 1) carrying the web with it whereby the loaf is wrapped in the manner described above and the web W is drawn off roll R and then cut. The leading edge of web W must then be positioned with relation to the next loaf L to be wrapped, which is shown in Fig. 7, to cause the leading printed pattern or label K to be centered on the top face of article L when it is enfolded in the leading end of web W. The scanner (the light source 3 thereof only being illustrated in Fig. 7) is in such relation to the leading face of the loaf that it is a distance *Ca* (Fig. 7) away from the lower corner of the leading face of the loaf varying by approximately + or − ½ inch, depending on the loaf height E (Fig. 9). The indicia or printed mark M is then a distance *Rs* (not exceeding approximately 2⅞") from the light beam of the scanner.

During the time that the web W (Fig. 7) was being pulled forward during the enfoldment of the preceding loaf, and the register mark M was thereby pulled to position M2 it passed under the scanner at some time when the section A of cam 108 (Fig. 15) was in contact with the roller of cam switch C. S. 3, which may have any suitable construction. The cam 108, which is secured on shaft 46, is shown in Fig. 2 engaging the roller of the cam switch C. S. 3, but the remainder of this switch is broken away in this view. Cam switch C. S. 3 is the reset switch and when closed by section A of cam 108 allows (the single pole switch SW6 having been previously closed manually to energize the register amplifier 2 and the double pole switch SW7 being in its closed position 1s) photoelectric cell 5 to energize relay R3 and close its contact when there is a change in light created by an indicia or printed spot. Normally, with a dark spot on a light background, the photoelectric cell 5 operates on the change from light to dark when a printed spot M on web W intercepts the light beam of the scanner. If the photocell 5 operates on a change from light to dark resulting from passage of the leading edge of the printed mark M the latter may come to rest under the light beam. Upon retraction of web W there would be no change from light to dark, only from dark to light. Consequently we will get a maximum retractor stroke instead of none and have short bottom lap on the loaf wrapped in this cycle and cause two or three following loaves to be wrapped without registration before the web is pulled back into registered position. Therefore it is preferred to operate the photocell 5 on a change from dark to light created by passage of the trailing edge of the indicia or printed mark M, since the relay R3 will then not be energized until the indicia passes completely through the light beam. Therefore the indicia M is bound to intercept the light beam on retraction of the web W. For this purpose the photocell 5 may be connected by a cable X to an amplifier circuit (not shown) forming a part of the amplifier 2 and having its output connected to the winding of relay R3 to energize the latter whenever the light beam projected on to photocell 5 is intercepted by an indicia M while switch C. S. 3 is closed.

Referring to Fig. 15, it may be noted, that when a register mark M of web W has tripped the register amplifier 2 by closing contact of relay R3 during the forward movement of web W, the following sequence of operations occurs—power goes from one side of the source of electrical current, which may be the supply mains Z connected to a 110 volt or 220 volt, 60 cycle A. C. current, through contact of relay R3 to the coil or winding R1 of an interlocking relay of any suitable construction such as manufactured by the Guardian Electric Manufacturing Company, Chicago, Illinois. The pivoted armature R1*a* of this relay is normally held by a tension spring R1*s* in position to close the contact N. C. The current flows from coil R1 through cam switch C. S. 4 and back through the switch SW6 to the other side of the source of electric current. Thus the coil R1 is energized and the armature R1*a* attracted thereto to close the contact N. O. and open contact N. C. At the same time the pivoted armature R2*a* of this relay is swung behind the armature R1*a* by the tension spring R2*s*, to lock it in the position wherein contact N. O. is closed. No other electrical action occurs during this period.

As soon as the web W stops moving forward in the direction indicated by the arrow F (Fig. 7), the depressed section C of cam 108 comes under the roller of cam switch C. S. 3 thereby opening it and resetting the amplifier 2 for register again by opening the contact of relay R3. The winding R1 is thus de-energized, but contact N. O. is held in the closed position by the armature R2*a*. When cam 108 turns sufficiently to bring the lobe B of cam 108 in contact with the roller of cam switch C. S. 3 again, and thereby closing it, the register amplifier 2 will be energized when the indicia M intercepts the light during the retraction of web W. At the same time, the roller 76 on gear 45 has engaged arm 78 (Fig. 15) and thereby closes the limit switch L. S. 1. Now, referring to Fig. 7, it may be seen that the retractor 16 is descending to the dotted position and the web W is thereby pulled back in the direction shown by the dotted arrow R*s*′ until the indicia or register mark M intercepts the light beam of the scanner at a position corresponding to position M3. When this occurs, the coil of relay R3 is again energized and its contact is closed. This allows current to go from one side of the source of current through contact R3 to and through the contact N. O. and thence through the limit switch L. S. 5 and limit switch L. S. 1 to the solenoid S and back through switch SW6 to the other side of the source of supply of current. This energizes solenoid S causing the retractor 16 to stop in its descent, and thereby stops the retraction of the web W so that the leading edge L1 thereof will occupy a position corresponding to the dotted line L2.

While the loaf L is wrapped in the leading end of web W which has been thus located to cause the printed panel K to be centered on the top face thereof, the cam 108 turns until the cam switch C. S. 3 is again opened. This de-energizes the register amplifier and contact R3 drops open. Just before switch C. S. 3 and contact R3 are opened, the circuit from winding R1 through cam switch C. S. 4 is broken and a circuit from winding R2 through cam switch C. S. 4 established when the high point or lobe of cam 109 engages the roller of switch C. S. 4. This breaks the circuit through winding R1 from the source of supply and thereby de-energizes it, and at the same time establishes a circuit from the winding R2 through the switch SW7 and switch C. S. 4 to and through switch SW6 back to the other side of the supply of current. Thus winding R2 is thereby energized to disengage its armature R2*a* from the armature R1*a* of winding R1. This action then restores the contacts controlled by winding R1 to the normal position shown in Fig. 15 wherein contact N. C. is closed.

In the event that there is a "no-loaf" skip, or a succession of such skips, in the infeed conveyor 6, then the retractor 16 is locked out and held inoperative until the next loaf is advanced into position to have its height gauged. This lockout is accomplished by cam 28 (Fig. 15) when it is permitted following the absence of a loaf under feeler 4 to rotate counterclockwise until it engages lever 36. Thus lever 36 is displaced into engagement with contact 38 of limit switch L. S. 5 and breaks the circuit which would be established therethrough from contact N. C. to solenoid S when limit switch L. S. 1 is closed by arm 77. Switch L. S. 5 then connects one side of the source of electrical current to limit switch L. S. 1 and through it, when it is closed during the portion of the cycle when the retractor 16 would normally operate, to the solenoid S and thence through switch SW6 to the other side of the source of electric current. Thus, solenoid S is energized to prevent the operation of the retractor in the manner previously described and thereby prevent retraction of the web W.

The preceding description covers the operation of the registration mechanism under normal conditions of loaf size and machine operation. With the type of web feed selected to illustrate the invention wherein the girth of the loaf and the stroke of lap roller 240 (Fig. 1) determine the amount of web pulled from the roll R, there are variations above and below the length of wrapping material required to enfold an article of normal girth. These variations are caused by (a) excessively small girth of the loaf not pulling enough web and/or slippage, (b) excessively large girth of the loaf pulling too much web and/or slippage. Without the conditions above mentioned, it would be adequate to have only the limit switch L. S. 5, limit switch L. S. 1, the light source 3 and photo-cell 5 of the scanner, the register amplifier 2, and the solenoid S wired as shown in Fig. 16 to provide satisfactory registration. To provide automatic compensation for the above conditions and thus prevent loss of register and/or the proper lap of edges of the wrapper on the bottom of the loaf, the interlocking relay R1—R2, limit switches L. S. 1 and L. S. 2, and cam switches C. S. 3 and C. S. 4 are required as illustrated in diagram Fig. 15.

Considering the case of an extremely small loaf wherefore insufficient material is pulled off roll R to bring the register mark M past the scanner (Fig. 7), the register mark M will stop directly under the light beam from the light source or just short of it. Under such conditions, the register amplifier 2 would not be tripped to close contact R3, and if contact R3 does not close then winding R1 of the interlocking relay R1—R2 does not become energized and its contacts stay in the normal position shown in Fig. 15. It may be noted that the scanner operates the register amplifier only on a change of light resulting from passage of the trailing edge of the register mark. Thus then, one side of the source of electric current will be connected through the contact N. C. and limit switch L. S. 5 to the limit switch L. S. 1. As soon as switch L. S. 1 closes at the beginning of the retractor stroke, it energizes solenoid S immediately and the retractor is locked out and retraction of the web W is prevented. The lockout will continue then for each succeeding cycle until, usually after wrapping of 1, 2, or 3 loaves, sufficient web has been pulled forward to allow the register mark M to move past the scanner, thereby allowing normal register action to occur again as described above under "Normal Operation." It is important to note here again that operation on the trailing edge of the indicia or register mark is preferred. If the provision just above described were not made, then maximum retractor stroke would occur (approximately 2⅞ inches) with a resulting loss of lap of the wrapper edges—if not on the first loaf, at least on the second loaf to follow. This would mean then that each succeeding loaf would go through the wrapping machine without sufficient bottom lap, causing jams and stoppages.

Next, considering the case wherein an excessively large loaf pulls so much web off roll R that the register mark M is pulled past the scanner by some distance in excess of the maximum retractor stroke. The action described under "Normal Operation" occurs, i. e., the contact N. O. closes and contact N. C. opens and the retractor 16 goes down to its maximum stroke, but the register mark M does not intercept the light beam in the scanner. Therefore contact R3 (Fig. 15) would remain open, except for the action of limit switch L. S. 2 (Fig. 15) which is closed only at the maximum stroke of the retractor by a pin on lug 66a on cam 66. If contact R3 were not closed (the action of limit switch L. S. 2 will be later described) the cam switch C. S. 4 when it is operated by the lobe of cam 109 would not energize the winding R2, because contact R3 is open. Therefore the armature R2a of the interlocking relay would not be disengaged from the armature R1a thereof, and this interlocking relay would be out of sequence with the operation of the web registering mechanism with the result that full retractor stroke would occur in each cycle of operations (excluding "no loaf" skips) and the web would never pull into step with the web registering mechanism without stopping the machine and rethreading the web. But when limit switch L. S. 2 closes, it trips the register amplifier 2 in the same manner as the interception of the light beam by a register mark M. This results in closing contact R3 and resetting the interlocking relay R1—R2 into correct sequence. Then in the next cycle, the register mark continues to go forward past the scanner before the segment A of cam 108 (Fig. 15) closes the cam switch C. S. 3. Contact R3 is thereby prevented from closing, and the retractor is locked out by solenoid S being energized by the circuit established therethrough from contact N. C. through limit switch L. S. 5 and limit switch L. S. 1 when the latter is closed. Therefore the loaf is wrapped in the web W in this cycle, and succeeding cycles, without registration until an indicia M intercepts the light beam while cam switch C. S. 3 is closed by section A of cam 108. This lockout may continue for a maximum of 8 loaves until a register mark M again comes into the range of action of the scanner whereupon the action described above under "Normal Operation" occurs. In the event that a loaf of excessively small girth should follow a loaf of excessively large girth instead of the lockout operation described immediately above the printed spot M would set up the sequence correctly on the enfoldment of web W about said following loaf and the register mark M would again fall into the retractor range and normal operation would then be resumed as previously described.

*Multiple spot register paper or wrapping material*

This is also called:

(a) "Ladder" Pattern Register Paper
(b) "Railroad Track" Pattern Register Paper
(c) "Picket" Pattern etc. Register Paper Multiple mark (spot) register paper W' suitable for wrapping loaves of bread and other articles is illustrated in Fig. 8. Electrical equipment, i. e., the scanner 3 and 5, amplifier 2, solenoid S, limit switches L. S. 1 and L. S. 5, and the wiring thereof to provide a web registering device which coacts with this type of wrapping material are shown in Fig. 16.

The web W' has a series of equally spaced printed labels or patterns K' corresponding to the printed patterns K of web W (Fig. 7) and similarly represented by cross-hatched rectangles. The patterns K' on web W' are properly spaced to be registered on the top face of each loaf and centered thereon, regardless of variations in the height thereof, in a manner which will now be described. The distance between two adjoining patterns K' is represented by the dimension line "Cutoff" and corresponds to the dimension line having the same legend in Fig. 7. There is a blank space indicated by the dimension line RM between each series of marks or indicia N printed or otherwise provided on web W' along one lateral edge thereof. It will be understood that the electric controls shown in Fig. 16 will be substituted for the construction shown in Fig. 15 when multiple spot register wrapping material is used in the wrapping machine described above.

*Normal operation*

For normal operation, the register mark of each series of mark N is always the first mark just preceding the blank space R on the web W' when it is advanced in the direction of the arrow F (Fig. 8). The register amplifier 2 (Fig. 16) is energized to close the contact of relay R3 when the light beam projected from the light source 3 of the scanner on to photo-electric cell 5 is intercepted by the leading edge of the register mark N of web W'. When operating normally, the blank space RM (Fig. 8) always stops under the light source 3 of the scanner. Then when retraction of web W' by the retractor 16 (Fig. 7) occurs, the last mark of each series of mark N intercepts the light beam of the scanner, thereby causing an impulse from phototube 5 to close the contact of relay R3 (Fig. 16) (switch S. W. 6 having been closed manually when wrapping of the articles on the machine is begun). This then connects the solenoid S (Fig. 16) across the source of supply of electric current, which may be supply lines Z connected to a 110 volt or 220 volt, 60 cycle A. C. current, and solenoid S is thereby energized to stop the retractor 16 with the web W' in registered position. Limit switch L. S. 1 (Fig. 16) is the reset switch, i. e. the register amplifier 2 can only respond to the register marks on the ladder pattern when this switch is closed. It is closed by engagement of a roller 76 on gear 45 with an arm 77 pivoted upon a pin 78 and adapted to close the limit switch L. S. 1 when displaced by the roller 76. The period of the cycle that this switch is closed corresponds to the period during which the stroke of the retractor 16 (Fig. 7) occurs. It will be understood that retractor 16 may be operated by the same mechanism described above.

Limit switch L. S. 5 is the "no loaf" or skip switch, and its action and function is as described previously for the no-loaf switch for single spot operation in connection with the construction illustrated in Fig. 15, namely to energize the solenoid S and lockout the retractor 16. Switch L. S. 5 (Fig. 16) will be closed in the same manner as the switch L. S. 5 (Fig. 15) by the rack cam 28 to prevent retraction of web W' when there is no loaf in the material feed which corresponds to the infeed conveyor 6 described above.

The preceding description covers the normal operation of the register control electrical circuit (Fig. 16) upon the Ladder Pattern wrapping material W' illustrated in Fig. 8. Again, as with the single spot register web W, there are variations in the amount of web pulled off the roll of wrapping material above and below normal requirements. These variations are caused by: (*a*) excessively large loaf pulling too much web, (*b*) excessively small loaf not pulling enough web and/or slippage of the web.

Considering the case wherein an excessively large loaf pulls so much web that the blank space RM of web W' (Fig. 8) is pulled to such an extent past the scanner that web W1 then stops with some section of the "multiple spots" N under the scanner. Under such conditions, it would be necessary to retract the web and amount in excess of the retractor stroke available. However, when the retractor starts to descend into the web W' and retracts it a distance equal to D (Fig. 8) the space between adjoining spots N (never more than ¼ inch), the next adjacent mark N will trip the register control and lock out the retractor. This action will continue to occur on successive loaves to a maximum of 8, depending upon the adjustment of the stroke of the lap roller 240, until the cutoff (Fig. 8) has advanced one frame bringing the panel K' back into correctly registered position with respect to the article to be wrapped.

Next, considering the case of an extremely small loaf whereby insufficient web is pulled from the roll to bring the spot N immediately preceding the blank space RM (Fig. 8) past the light beam of the scanner. Under such a condition, if retraction were possible, a maximum stroke would result in severance of a wrapper shorter than required and loss of lap of the edges of the wrapper on the bottom of the loaf, if not on the first loaf, at least on the second loaf to follow. This would mean then that each succeeding loaf would go through the machine with insufficient wrapper material until the machine was stopped. However, with the multiple spot web W' some portion of each series of multiple spots N will be stopped under the scanner, and the retractor will, when it starts to descend into the web, produce retraction thereof a distance equal to the space between marks N and cause the next adjacent mark to trip the register control and lock out the retractor. This will repeat to a maximum of 3 loaves when sufficient paper will be pulled forward by average size loaves to bring the web back into the correctly registered position described above. The condition just above described can be caused by slippage when the loaf is pulling the web.

It is noteworthy that the multiple register mark paper provides a fool-proof register control scheme in that no attention must be given to position of the blank space RM (Fig. 8) with relation to the scanner 3 and 5 (Fig. 6 or 7) when a new roll of web is threaded into the wrapping machine. This is because by the action described above, the web will automatically pull into correct registered position after wrapping from 1 to 10 loaves of bread.

The stroke of the lap roller 240 should be adjusted with each type of web registering mechanism described above to produce adequate lap for proper operation of the register control.

By a comparison of the function of the single spot register mechanism and control with the multiple spot register mechanism and control, it will be seen that they accomplish identical results under all the stated conditions. The main advantage of one type of construction over the other is the simplification of the construction of the web registering device obtained with the multiple spot web W'.

It may be noted that the web registering mechanism shown in Fig. 15 can be used with multiple spot type of wrapping material such as web W' by swinging the double pole switch S. W. 7 from contacts 1s to contacts 2s.

It will be understood that for transparent types of wrapping material, such as "cellophane," and translucent materials such as waxed paper, that the light may be transmitted through the wrapping material on to the photoelectric cell of the scanner. For foil and other opaque types of wrapping materials the photoelectric cell should be arranged to be operated by the reflection of light from the wrapping material.

Although we have described various embodiments of our invention, it will be understood that various modifications thereof may be made and that no limitations upon the invention are intended that are not imposed by the scope of the appended claims.

What is claimed is:

1. In a machine for wrapping articles of varying girth in a continuous web of wrapping material having indicia spaced along the length thereof at equal intervals corresponding to the length of wrapping material required to enfold an article having a predetermined girth, and printed panels arranged at equal intervals along the length of said web of wrapping material in the spaces between successive indicia; the combination with means for folding the leading end of said web of wrapping material about the girth of an article; of a retractor for retracting the leading end of said web of wrapping material prior to the enfoldment of an article therein; a device which is responsive to said indicia and adapted to terminate the operation of the retractor when one of said indicia is retracted into the proximity of said device whereby successive indicia will be advanced past said device during the enfoldment of articles in the leading end of the web of wrapping material and then retracted into the proximity of said device by said retractor; and mechanism for preventing the operation of said retractor when the enfoldment of an article in the leading end of said web of wrapping material fails to advance past said device one of the indicia on the web of wrapping material, said mechanism including retractor stopping means normally preventing the movement of said retractor and a control for said retractor stopping means actuated by said indicia responsive device when indicia are advanced past it to render said retractor stopping means inoperative.

2. In a machine for wrapping articles of varying girth in a continuous web of wrapping material having indicia spaced along the length thereof at equal intervals corresponding to the length of wrapping material required to enfold an article having a predetermined girth, and printed panels arranged at equal intervals along the length of said web of wrapping material in the spaces between successive indicia; the combination with a retractor for retracting the leading end of said web of wrapping material prior to the enfoldment of an article therein, to thereby position the leading printed panel on said web in a predetermined relationship with respect to a predetermined face of the article to be wrapped; of a device which is responsive to said indicia and adapted to terminate the operation of the retractor when one of said indicia is retracted into the proximity of said device; and mechanism for preventing the operation of said retractor in the following cycles of operation of the machine when the operation of said retractor fails to retract one of the indicia on the web of wrapping material into the proximity of said device, said mechanism including a circuit adapted to activate said device to terminate the operation of said retractor, and a normally opened switch in said circuit operatively mounted to close when said retractor has retracted to the limits of its movement.

3. In a machine for wrapping articles of varying girth in the leading end of a continuous web of wrapping material having indicia spaced along the length thereof at equal intervals corresponding to the length of wrapping material required to enfold an article having a predetermined girth, and printed panels arranged at equal intervals along the length of said web of wrapping material in each of the spaces between successive indicia; the combination with means for folding the leading end of a continuous web of wrapping material about the girth of an article; of a retractor for retracting the leading end of said web of wrapping material prior to the enfoldment of each article therein to thereby locate the leading printed panel on said web in a predetermined relationship with respect to the article to be wrapped; a source of light arranged to project a beam of light upon a predetermined portion of said web whereby one of said indicia will be advanced past the light beam during the enfoldment of an article in the leading end of the web of wrapping material and will subsequently intercept said light beam during the retraction of said web of wrapping material; a photoelectric device responsive to such interception of the light beam by one of the indicia and adapted to terminate the operation of said retractor upon such interception of the light beam and thereby control the extent to which the web of wrapping material is retracted; and mechanism for preventing the operation of said retractor when the enfoldment of the preceding article to be wrapped in said web of wrapping material fails to advance one of the indicia on the web of wrapping material past the beam of light, said mechanism including an electric circuit adapted to prevent the operation of said retractor, a normally closed switch in said circuit, and means responsive to said device when indicia are advanced past it to open said switch in said circuit.

4. In a machine for wrapping articles of varying girth in the leading end of a continuous web of wrapping material having indicia spaced along the length thereof at equal intervals corresponding to the length of wrapping material required to enfold an article having a predetermined girth, and printed panels arranged at equal intervals along the length of said web of wrapping material in each of the spaces between successive indicia; the combination with a retractor for retracting the leading end of said web of wrapping material prior to the enfoldment of each article therein to thereby position the leading printed panel on said web in a predetermined relationship with respect to the article to be wrapped; of a source of light arranged to project a beam of light upon a predetermined portion of said web whereby one of said indicia will intercept said light beam during the retraction of said web of wrapping material; a photoelectric device responsive during the retraction of said web to the interception of the light beam by one of the indicia and adapted to terminate the operation of said retractor upon such interception of the light beam and thereby control the extent to which the web of wrapping material is retracted; and mechanism for preventing the operation of said retractor unit during subsequent cycles of the machine when the retraction of said web by said retractor fails to move one of the indicia on the web of wrapping material into position to intercept the beam of light, said mechanism including a circuit adapted to activate said device, a normally opened switch in said circuit interconnected with said retractor to close when said retractor is retracted the limits of its movement, a normally closed circuit adapted to prevent the operation of said retractor, and means responsive to said device to open said closed circuit when indicia are advanced past it during predetermined phase intervals in the enfoldment of an article.

5. In a machine for wrapping articles of varying girth in a continuous web of wrapping material having indicia spaced along the length thereof at equal intervals corresponding to the length of wrapping material required to completely enfold an article having a predetermined girth, and printed panels arranged at equal intervals along the length of the web of wrapping material in each of the spaces between successive indicia; the combination with a retractor for retracting the leading end of said web of wrapping material prior to the enfoldment of each article therein; a source of light arranged to project a beam of light upon a predetermined portion of said web whereby one of said indicia will intercept said light beam during the retraction of said web of wrapping material; a photoelectric device which is responsive to such interception of the light beam and adapted to terminate the operation of the retractor upon such interception of the light beam and thereby control the extent to which the leading end of the web of wrapping material is retracted; means for moving said light source lengthwise of the web of wrapping material for the retraction thereof to regulate the position at which said indicia will intercept said light beam; and instrumentalities for determining the height of the article to be wrapped and correspondingly regulating the extent to which said light beam is moved by said means and thereby regulating the retraction of said web by the retractor to position the leading printed panel on the web in a predetermined relationship to a predetermined face of the article to be wrapped.

6. In a machine for wrapping articles of varying girth in a continuous web of wrapping material having indicia spaced along the length thereof at equal intervals corresponding to the length of wrapping material required to enfold an article having a predetermined girth, and printed panels arranged at equal intervals along the length of the web of wrapping material in each of the spaces between successive indicia; the combination with a retractor for retracting the leading end of said web of wrapping material prior to the enfoldment of each article therein; a source of light arranged to project a beam of light upon a predetermined portion of said web whereby one of said indicia will be advanced past the light beam during the enfoldment of an article in the leading end of the web of wrapping material and will subsequently intercept said light beam during the retraction of said web of wrapping material; a photoelectric cell which is responsive both to the passage of the trailing edge of said indicia through the light beam upon the enfoldment of an article in the web, and to the interception of the light beam during the retraction of said web; and an electric control connected to said photoelectric cell and adapted to be energized upon passage of the trailing edge of an indicia through the light beam during the advancement of said web and to terminate the operation of the retractor upon interception of the light beam by said indicia during the retraction of said web whereby the retractor will not be operated unless the trailing edge of an indicia passes through the light beam.

7. A web registration device for a web of wrapping material having indicia spaced along its length at equal intervals corresponding to the length of wrapping material required to enfold an article having a predetermined girth, comprising a retractor adapted to retract the leading end of said web of wrapping material by a predetermined maximum to thereby locate the leading end of said web with respect to an article to be wrapped, a source of light arranged to project a beam of light upon a predetermined portion of said web whereby one of said indicia will be advanced past the light beam during the enfoldment of articles in the leading end of the web of wrapping material and will subsequently intercept said light beam during the retraction of said web of wrapping material, a control which is responsive to the interception of the light beam by one of the indicia during the retraction of said web and adapted to terminate the operation of the retractor upon such interception of the light beam and thereby regulate the extent to which the web of wrapping material is retracted, and means interconnecting said retractor and said indicia responsive device operating to prevent the operation of said retractor whenever said indicia is stopped prior to retraction of said web in a position at such distance from the light beam that it will not be moved through the light beam by operation of said retractor.

8. In a wrapping machine, a web registration device for a web of wrapping material having indicia spaced along its length at equal intervals corresponding to the length of wrapping material required to enfold the girth of an article to be wrapped comprising means for positioning the leading end of said web of wrapping material with respect to an article to be wrapped, a device which is responsive to the proximity of one of said indicia and adapted to terminate the operation of said web positioning means upon proximity of one of said indicia thereto and thereby regulate the position of the leading end of the web of wrapping material with respect to the article to be wrapped; and mechanism for preventing the operation of said web positioning means in the next cycle of operations whenever one of the indicia on the web of wrapping material is not advanced into the proximity of said device by the operation of said web positioning means, said mechanism including means adapted to inactivate said positioning means when said positioning means has not advanced said indicia into proximity of said device, and a reset instrumentality mounted to permit further operation of said positioning means upon the advance of subsequent indicia past said device during a predetermined period in the cycle of said wrapping machine.

9. A web registration device for a web of wrapping material having indicia spaced along its length at equal intervals corresponding to the length of wrapping material required to completely enfold the girth of an article to be wrapped, comprising a retractor for retracting the leading end of said web of wrapping material prior to the enfoldment of each article therein to thereby position the leading end of said web with respect to an article to be wrapped; a device which is responsive to said indicia and adapted during the retraction of said web to terminate the movement of the retractor upon movement of one of the indicia into a predetermined position, and thereby regulate the extent to which the web of wrapping material is retracted; and selective mechanism operative to prevent further operation of said retractor unit when one of said indicia are retracted to a position outside the range of said device, said mechanism including also a reset instrumentality to permit further operation of said retractor unit when a subsequent indicia is located at a position within the range of operation of said device.

10. A web registration device for a web of wrapping material having indicia spaced along its length at equal intervals corresponding to the length of wrapping material required to completely enfold the girth of an article to be wrapped, comprising means normally operating to displace the leading end of said web of wrapping material by a predetermined extent prior to the enfoldment of each article therein to thereby position the leading end of said web with respect to an article to be wrapped; a device which is responsive to said indicia and adapted to terminate the operation of the web positioning means upon movement of one of the indicia into the proximity of said device by said web positioning means and thereby regulate the extent to which the web of wrapping material is displaced relative to the article to be wrapped; and a mechanism to inactivate said web positioning means whenever none of said indicia is displaced into the proximity of said device by the operation of said web positioning means.

11. In a wrapping machine for wrapping articles of varying girth in a continuous web of wrapping material having a series of printed spots arranged at equal intervals along the length of said web corresponding to the length of wrapping material required to completely enfold an article having a predetermined girth, and printed panels arranged on portions of said web intermediate successive series of printed spots; means for enfolding an article in the leading end of a continuous web of wrapping material; a source of light arranged to project a beam of light upon a predetermined portion of said web whereby a blank section of said web intermediate adjoining series of printed spots will be stopped in a position intercepting the light beam following the enfoldment of the article in the leading end of the web of wrapping material; a retractor for retracting the leading end of said web of wrapping material prior to the enfoldment of each article therein, to locate the leading printed panel on said web in a predetermined relationship with respect to a predetermined face of the article to be wrapped upon interception of said light beam by the last spot on one of said series of printed spots during the retraction of said web of wrapping material; and a device responsive to the interception of the light beam by the last spot of one of said series of printed spots during the retraction of said web and adapted to terminate the operation of said retractor upon such interception of the light beam, and thereby control the extent to which the web of wrapping material is retracted, said device also being adapted to terminate the operation of said retractor upon interception of said light beam by any other printed spot of said series of spots whereby a number of articles will be wrapped without registration of the web.

12. The method of wrapping articles of varying girth in a continuous web of wrapping material having spaced series of printed marks along the length thereof, the distance from the last mark of one of said series to the last mark of an adjoining series corresponding to the length of wrapping material required to completely enfold an article having a predetermined girth, which comprises pushing an article into the leading end of said web of wrapping material to enfold the article and to advance the immediately adjoining section of said web of wrapping material into position to enfold the next article to be wrapped; severing the section of the web enfolding the article from the remainder of the web; retracting the leading end of said web of wrapping material until the last mark of one of said series reaches a predetermined position, and thereby locating a predetermined section of the web relative to the series of marks in a predetermined relationship with respect to an article to be wrapped, and terminating the retraction of said web if one of the other marks of said series of marks reaches said predetermined position when said web is retracted so that said web may be relocated during subsequent wrapping of articles.

13. A photoelectric scanner unit comprising a light source arranged to project a beam of light upon a web of wrapping material for wrapping articles of variable size and having spaced indicia thereon whereby the light beam will be intercepted by successive indicia on said web; a photoelectric cell responsive to the interception of the light beam by one of the indicia; and means operative in response to the size of an article to be wrapped for moving said light source and photoelectric cell along the length of said web, said means including a support for said light source and photoelectric cell which is pivoted on a horizontal axis, said axis being sufficiently remote from said web to permit the light source to be moved in an approximately horizontal path and thereby vary the position at which the light beam will be intercepted by one of said indicia.

14. A photoelectric scanner unit comprising a light source arranged to project a beam of light upon a web of wrapping material having spaced indicia thereon whereby the light beam will be intercepted by successive indicia on said web; a photoelectric cell responsive to the interception of the light beam by one of the indicia; and means for moving said light source and photoelectric cell along said web to vary the position at which the light beam will be intercepted by one of said indicia, said means including a support for said light source and photoelectric cell which is pivoted on a horizontal axis, a stationary shaft, a member fixed to said shaft and connected to said support, a cam lever loosely mounted on said shaft, a cam roller on said cam lever, a rotary cam engaging said roller, means for yieldingly maintaining said roller in engagement with said cam, and a stop adjustably mounted in said member engaging said cam lever whereby adjustment of said stop will vary the center of oscillation of said support.

15. The combination with a photoelectric scanner including a light source and a photoelectric cell, of means for moving said scanner along the length of a web of wrapping material having indicia equally spaced along the length thereof, and mechanism for determining the height of an article to be wrapped in said web and controlling said means to regulate the movement of said scanner in conformity with the height of the article to be wrapped.

16. The combination with a photoelectric scanner including a light source and a photoelectric cell, of means for moving said scanner along the length of a web of wrapping material having indicia equally spaced along the length thereof, and mechanism for determining the height of an article to be wrapped in said web and controlling said means to regulate the movement of said scanner in conformity with the height of the article to be wrapped, said mechanism including a pivoted feeler arranged to rest on the top of the article to be wrapped, a stop connected to said feeler to thereby be moved into various positions corresponding to the height of the article engaged by said feeler, a rotary cam, a cam lever, a cam roller on said lever engaging the periphery of the rotating cam, a stationary cam, yielding means adapted to turn said stationary cam into various positions determined by the position of said stop, the periphery of said rotating cam having a predetermined configuration to permit the cam roller to engage the periphery of the stationary cam during the rotation of the rotating cam whereby the position of the stationary cam determined by said stop will determine the position at which said scanner will be stopped.

17. The combination with a photoelectric scanner including a light source and a photoelectric cell, of means for moving said scanner along the length of a web of wrapping material having indicia equally spaced along the length thereof, and mechanism for determining the height of an article to be wrapped in said web and controlling said means to regulate the movement of said scanner in conformity with the height of the article to be wrapped, said mechanism including a pivoted feeler arranged to rest on the top of the article to be wrapped, a stop connected to said feeler to thereby be moved into various positions corresponding to the height of the article engaged by said feeler, a rotary cam, a cam lever, a cam roller on said lever engaging the periphery of the rotating cam, a stationary cam, yielding means adapted to turn said stationary cam into various positions determined by the position of said stop, the periphery of said rotating cam having a predetermined configuration to permit the cam roller to engage the periphery of the stationary cam during the rotation of the rotating cam whereby the position of the stationary cam determined by said stop will determine the position at which said scanner will be stopped, and a device for locking said stationary cam in the position determined by said stop.

18. The combination with a retractor adapted to retract a web of wrapping material with respect to an article to be wrapped, of a shaft on which said retractor is mounted, a cam lever on said shaft, a cam shaft, a rotary cam secured on said cam shaft, a cam segment loosely mounted on said cam shaft, a primary cam follower mounted on said cam lever and engaging the periphery of said rotary cam, a secondary cam follower mounted on said cam lever and engaging one end face of said cam segment, and a spring urging said cam segment against said secondary cam follower whereby said primary cam follower is maintained in engagement with the periphery of said rotary cam to operate said retractor.

19. The combination with a retractor adapted to retract a web of wrapping material with respect to an article to be wrapped, of a shaft on which said retractor is mounted, a cam lever on said shaft, a cam shaft, a rotary cam secured on said cam shaft, a cam segment loosely mounted on said cam shaft, a primary cam follower mounted on said cam lever and engaging the periphery of said rotary cam, a secondary cam follower mounted on said cam lever and engaging one end face of said cam segment, and a spring urging said cam segment against said secondary cam follower whereby said primary cam follower is maintained in engagement with the periphery of said rotary cam to operate said retractor, a ratchet secured to said cam segment and provided with teeth on its periphery, a pawl adapted to engage said teeth to interrupt the rotation of said cam segment and thereby disengage said primary cam follower from the periphery of said rotary cam and interrupt the movement of said retractor.

20. The combination with mechanism for determining the height of an article to be wrapped; of means for indexing wrapping material to control the feed thereof in conformity with the height of an article to be wrapped therein; said mechanism including a feeler adapted to rest on the top of the article to be wrapped to register its height, an electric circuit controlling said means and including a limit switch adapted when closed to discontinue the operation of said means, and a member controlled by said feeler for closing said limit switch when there is no article to be wrapped under said feeler.

21. In a wrapping machine, the combination with scanning means for locating a continuous web of wrapping material with its leading end in a predetermined position to permit an article to be enfolded therein, of a pusher adapted to advance an article from a predetermined delivery station into the leading end of said web for enfoldment therein, a conveyor adapted to advance articles to be wrapped intermittently to said delivery station, and a device for determining the height of said articles to adjust said scanning means in conformity with one of said articles to be wrapped and adapted to incapacitate said web locating means upon the absence of an article to be wrapped.

22. In a web registration device, the combination with means for locating a continuous web of wrapping material, said means including a movable member engaging said web and having a predetermined maximum extent of movement; of an electric control adapted when energized to interrupt the operation of said web locating means; an electric circuit connected to said control, said circuit including a normally open limit switch adapted to energize said control when closed and arranged to be closed when said movable member moves through the maximum extent of its movement whereby the operation of said web locating means will be interrupted in the following cycle.

23. In a web registering mechanism, the combination with means for locating a continuous web of wrapping material, of a source of light arranged to project a beam of light upon a continuous web of wrapping material provided with spaced indicia, a photoelectric cell which is responsive to the interception of the light beam by one of said indicia while the web is being located by said means, an electric control connected to said photoelectric cell and adapted to interrupt the operation of said web locating means when the light beam is intercepted by one of said indicia, a device for periodically energizing said electric control to produce interruption of the operation of the web locating means if the light beam is intercepted by one of said indicia, and instrumentalities for de-energizing said control in the following cycles of operation of said web locating means if one of said indicia does not intercept said light beam, while the control is energized by said instrumentalities, during the operation of said web locating means.

24. In a web registering mechanism, the combination with means for locating a continuous web of wrapping material, of a source of light arranged to project a beam of light upon a continuous web of wrapping material provided with spaced indicia, a photoelectric cell which is responsive to the interception of the light beam by one of said indicia while the web is being located by said means, an electric control connected to said photoelectric cell and adapted to interrupt the operation of said web locating means when the light beam is intercepted by one of said indicia, a device for periodically energizing said electric control to produce interruption of the operation of the web locating means if the light beam is intercepted by one of said indicia, and instrumentalities for de-energizing said control in the following cycles of operation of said web locating means if one of said indicia does not intercept said light beam, while the control is energized by said instrumentalities, during the operation of said web locating means, said control including a device for regulating the same to permit a continuous web of wrapping material having spaced series of indicia thereon, to be located by said means whereby the interception of said light beam by any one of indicia during the retraction of said web and energization of said control by said instrumentalities will terminate the operation of said web locating means.

25. In a web registration device for a continuous web of wrapping material drawn from a roll, the combination with a retractor adapted to retract the leading end of the continuous web of wrapping material with respect to an article to be wrapped, of a member yieldingly connected to said retractor and operated by said retractor for clamping a portion of said web intermediate said roll and retractor to prevent drawing of wrapping material from the roll by the operation of said retractor.

26. In a web registration device, the combination with a retractor adapted to retract a continuous web of wrapping material with respect to an article to be wrapped, of a device adapted to clamp a portion of said web intermediate said retractor and the article to be wrapped, and means operating from said retractor for operating said clamping device when the operation of said retractor is terminated.

27. In a web registration device, the combination with a retractor adapted to retract a continuous web of wrapping material with respect to an article to be wrapped, of a device adapted to clamp a portion of said web intermediate said retractor and the article to be wrapped, and means operating from said retractor for operating said clamping device both when the operation of said retractor is terminated, and again when the wrapper is being separated from the leading end of said web.

28. In a web registration device, the combination with means for advancing a continuous web of wrapping material having indicia spaced along its length at equal intervals corresponding to the length of wrapping material required to enfold an article having a predetermined girth, printed panels arranged at equal intervals along the length of the web of wrapping material in each of the spaces between successive indicia, a retractor for retracting the leading end of said web of wrapping material a predetermined maximum amount, a control mechanism comprising a control circuit operative to arrest the motion of said retractor, a photoelectric device in said circuit responsive to the retraction of one of said indicia by said retractor into its range to thereby arrest said retractor, a second control circuit including means operative to inactivate said retractor when one of said indicia has been advanced during the advancement of said web beyond the operative range of said photoelectric device, and a third control circuit including means operative to inactivate said retractor when said indicia has been advanced by said first-named advancing means short of the operative range of said photoelectric device, and means for selectively operating one of said circuits depending upon the position of the indicia as a result of the normal or abnormal feed of said web to arrest the retractor irrespective of the position of an indicia relative to the photoelectric device.

29. In a wrapping machine, a web registration device for a web of wrapping material having indicia spaced along its length at equal intervals corresponding to a length of wrapping material required to completely enfold the girth of an article to be wrapped, comprising means normally operating to displace the leading end of said web of wrapping material by a predetermined extent prior to the enfoldment of each article therein to thereby position the leading end of said web with respect to an article to be wrapped, a normally closed circuit adapted to prevent the operation of said web positioning means, a device which is responsive to said indicia and adapted both to terminate the operation of the web positioning means upon the movement of one of the indicia into the proximity of said device by said web positioning means and thereby regulate the extent to which the web of wrapping material is displaced relative to the article to be wrapped and to open said circuit when said indicia come into proximity during a predetermined time during the enfoldment of an article in said web so that said device terminates the operation of said web positioning means when said indicia comes into its proximity and said web positioning means is prevented from operating by said circuit whenever said indicia pass said device during off-phase predetermined time intervals.

30. In a wrapping machine for wrapping articles of varying girth in a continuous web of wrapping material having spaced indicia thereon, feelers adapted to contact one of said articles to measure its height, a scanner unit responsive to said indicia, and means controlled by said feelers for moving said scanner unit along the length of said web to vary the position in which said scanner will be affected by said indicia in conformity with the height of one of said articles.

31. In a wrapping machine for wrapping articles of varying girth in a web having design panels thereon at regular intervals and spaced indicia to locate said panels; an indexing device responsive to said indicia and movable along the length of said web; means controlled by said indexing device to position said web; a feeler adapted to rest on the top of the article to be wrapped to determine its height; selective means controlled by said feeler for locating said indexing device in accordance with variation in the height of the article to be wrapped, an electric circuit controlling said positioning means and including a limit switch adapted when closed to discontinue the operation of said positioning means and a member controlled by said feeler for closing said limit switch when there is no article to be wrapped under said feeler.

32. In a machine for wrapping articles of varying girth in a continuous web of wrapping material having indicia spaced along the length thereof at equal intervals corresponding to the length of wrapping material required to enfold an article having a predetermined girth, the combination with means normally operating to displace the leading end of said web of wrapping material by a predetermined extent with respect to an article to be wrapped prior to the enfoldment of the article therein; of a mechanism sensitive to said indicia and adapted to terminate the operation of said web displacing means when said indicia are brought in close proximity thereto, said mechanism being movably mounted for movement lengthwise of the web of wrapping material for the retraction thereof to regulate the position at which said indicia will be brought in close proximity of said mechanism, a device for determining the height of the article to be wrapped, and instrumentalities operated by said device and correspondingly moving said sensitive mechanism along said web to thereby regulate the displacement of said web by said web displacing means in a predetermined relationship to the height of the article to be wrapped.

WILLIAM C. BROEKHUYSEN.
ERNEST E. POHL.
FRANK J. ROEHM.

References Cited in the file of this patent

UNITED STATES PATENTS

| Number | Name | Date |
|---|---|---|
| 1,117,260 | Sevigne | Nov. 17, 1914 |
| 1,182,393 | Luttropp | May 9, 1916 |
| 1,984,657 | Rosenthal | Dec. 18, 1934 |
| 1,991,423 | Shaver | Feb. 19, 1935 |
| 2,033,857 | Smith et al. | Mar. 10, 1936 |
| 2,082,945 | Ferenci | June 8, 1937 |
| 2,127,028 | Hayssen | Aug. 16, 1938 |
| 2,250,209 | Shoults et al. | July 22, 1941 |
| 2,342,584 | Hoppe | Feb. 22, 1944 |